Figure 1:
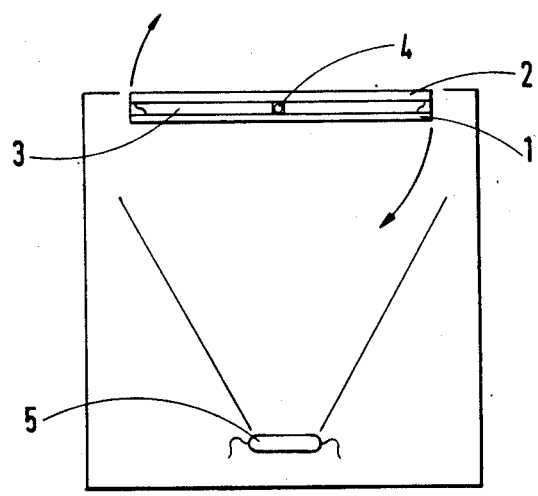

United States Patent [19]

Fosh

[11] Patent Number: 4,669,870
[45] Date of Patent: Jun. 2, 1987

[54] VACUUM CONTACT SYSTEM
[75] Inventor: Brian F. Fosh, Bishops Stortford, England
[73] Assignee: Parker Graphics Limited, London, England
[21] Appl. No.: 828,300
[22] Filed: Feb. 11, 1986
[30] Foreign Application Priority Data Oct. 31, 1985 [GB] United Kingdom ................ 8526880

[51] Int. Cl.$^4$ ............................................ G03B 27/20
[52] U.S. Cl. ........................................ 355/91; 355/76; 355/92
[58] Field of Search ........................ 355/73, 76, 79, 91, 355/92, 93, 94

[56] References Cited
U.S. PATENT DOCUMENTS 4,484,813 11/1984 Maher et al. ............................ 355/93
4,551,016 11/1985 Maher et al. ............................ 355/91

Primary Examiner—Monroe H. Hayes
Attorney, Agent, or Firm—Ladas & Parry

[57] ABSTRACT

A vacuum contact system has a vacuum contact frame including a bi-layer blanket having top and bottom layers spaced apart by a number of parallel strip members to define a first space. A bead is positioned around the outer edges of the top layer to support a glass plate so that a second space is formed. Vacuum connectors communicate with the second space and a further vacuum connector communicates with the first space, all the connectors being connected to a vacuum pump. The first and second spaces have the atmosphere therein controlled by electromagnetic valves located in a vacuum circuit with the pump.

In operation a film master and a presensitized material are located in the second space and the vacuum circuit is arranged to remove air from both the first and second spaces so that the two layers of blanket are drawn together. Ridges formed by the strip members are thus formed in the top layer outer surface and these ridges press the film master and presensitized material against the glass plate. The vacuum circuit is then arranged to vent the space between the two blanket layers to atmosphere so that overall contact of the blanket layer is made against the film master and presensitized material which are thus sandwiched between the blanket layer and the glass plate substantially over the whole area of the film master.

17 Claims, 14 Drawing Figures

VACUUM CONTACT SYSTEM

This invention relates to a vacuum contact system.

In the Printing Industry it is known, such as in lithographic printing, to expose film onto a sheet or plate of presensitised material from light sources comprising ultraviolet light or tungsten light. It is of course important whem making such exposure that a negative or positive film master is maintained in close contact with the presensitised material to achieve a true image reproduction on the presensitised material. The presensitised material may be a plate or a film.

A known manner of achieving even contact between the film master and presensitised plate uses a vacuum contact frame having a rubberised sheet means, known in the art as a blanket, provided thereon and a beading along the edges of the blanket supports a glass. The presensitised plate is laid on the blanket and the film master is sandwiched between the pre-sensitised plate and the glass plate. A vacuum pump is connectable with the space between the blanket and glass plate for substantially evacuating air from this space. The blanket therefore distorts as a result of the vacuum and presses the presensitised plate against the master which is in turn pressed against the glass plate.

Whilst this known construction is applied in various forms to various machines, in each, air pockets occur between the presensitised plate and the film master as well as between the film master and glass plate resulting in uneven contact between the presensitised plate and the film master, and the film master and glass plate, causing distortion of the true image being transferred.

Attempts have been made to remove the air pockets prior to exposure of the film master. One such arrangement is to be found in Published German Patent Application No. 3122707 which discloses a system of rollers which are arranged to move across the outer surface of the blanket and thereby roll out any air pockets. However, with such an arrangement difficulties are experienced in the registration of the film master relative to the presensitised plate and furthermore the roller mechanism is subject to mechanical failure.

Another vacuum contact frame is disclosed in German Patent Specification No. 2928320 in which the blanket surface engaging the presensitised plate is provided with a series of criss-cross grooves to minimise the occurance of air pockets. Blankets having fabric textured surfaces or other specialised surface textures with various coefficient of friction are also disclosed. However, whilst such arrangements have achieved some success this has been at the expense of both speed of operation and level of contact between the respective layers.

Yet another attempt to remove air pockets between the film master and presensitised plate requires the provision of air inflation bags under the vacuum blanket to remove air pockets by forcing the blanket against the presensitised plate before the vacuum is drawn from the space between the blanket and glass. The disadvantage of this system is that it is expensive because of the additional air pump required, and the extra time required to inflate the air bags which are themselves subject to leakage of air.

In yet another system the blanket is temporarily held in a position around its edges in which it is spaced apart from the presensitised plate whilst a vacuum is applied between the blanket and the glass plate thereby causing the centre portion of the blanket to engage the presensitised plate. As the vacuum increases the remainder of the blanket is gradually pulled upwardly providing a roller effect from the centre outwardly to remove the air pockets. Therefore, the most probable area of contact failure, that is the central area, is arranged to contact first. A similar zoning effect may be achieved with moulded or padded blankets.

In other systems the blankets may be subject to the pressure of pretensioned compression springs to press the blanket against the presensitised plate in a predetermined manner or alternatively the space between the blanket and glass is subject to pre-timed variable levels of vacuum prior to full vacuum so that the blanket gradually engages the presensitised plate in a similar manner as in the zoning effect referred to above.

All the system have varying degrees of success but all are still subject to the presence of air pockets, loss in operating speed, and increased costs.

Therefore, it is desirable to provide a vacuum contact system in which these disadvantages are substantially overcome.

According to one aspect of the present invention there is provided a vacuum contact system including a vacuum contact frame, a bi-layer sheet means having a spacing means defining a first spacing between the two layers thereof, and a glass plate over the sheet means, and means for defining a second spacing between the sheet means and glass plate such that a film master and presensitised material and locatable in the second spacing for contact one against the other and subsequent exposure of the film master onto the presensitised material, vacuum pump means connected to each of the first and second spacings, and control means for controlling the coupling of the vacuum pump means to the first and second spacings such that the vacuum pump means removes air from both the first and second spacings and then the control means allows the first spacing to be vented such that under the vacuum maintained in the second spacing the layer of the support blanket adjacent the glass plate presses the presensitised material substantially evenly against the film master over the area of the film master against said glass plate.

In one preferred embodiment of the present invention the vacuum pump means is a single vacuum pump.

The control means preferably includes at least one electromagnetic valve arranged to control the connection of the vacuum pump to the first and second spacings. Conveniently, a pair of electromagnetic valves are connected, electrically, in parallel, one being arranged to be normally open and the other normally closed. In an embodiment of the invention the normally open electromagnetic valve is vented to atmosphere and the normally closed electromagnetic valve is closed to vacuum. Alternatively a single composite electromagnetic valve device is used to control the connection of the vacuum pump to the first and second spacings.

Conveniently, the means for defining the second spacing is a bead provided along each edge of the sheet means adjacent the glass plate for abutting and sealing therewith. Preferably the spacing means comprises a plurality of spaced strip members.

Conveniently, the strip members are longitudinally castellated to facilitate evacuation of the first spacing and said strip members are located in a space parallel configuration. Advantageously a first and a second vacuum connector is provided for communicating with a respective first and second spacing, said vacuum connectors being connected to the vacuum pump means. Preferably each connector in a portion thereof located in an associated spacing has a planar face in which is provided a cruciform shaped recess. In one embodiment a strip member extends radially from opposing limbs of the cruciform shaped recess of an associated connector.

According to another aspect of this invention there is provided a vacuum contact frame system comprising a bi-layer sheet means having spacing means defining a first spacing between the two layers thereof and being arranged for supporting a film master and presensitised material onto which the film master is to be exposed, a glass plate arranged to be located over the sheet means and combination of film master and presensitised material, means for defining a second spacing between the sheet means and the glass plate, and vacuum connector means mounted on the sheet means for communicating with the first and second spacings respectively and for removing air therefrom.

According to a further aspect of this invention there is provided a method of operating a vacuum contact frame system comprising a bi-layer sheet means having a plurality of strip members defining a first spacing between the two layers thereof, a glass plate locatable over the sheet means, means defining a second spacing between the sheet means and the glass plate, and vacuum connector means communicating with and removing air from the first and second spacings, the method comprising obtaining a vacuum in both the first and second spacings to draw the layers of the sheet means together so that ridges are formed in said layers by virtue of the strip members and so that the sheet means is drawn toward the glass plate to sandwich a presensitised material and a film master to the glass plate by the sheet means ridges, said presensitised material being adjacent said sheet means and said film master being adjacent said glass plate, venting the first spacing to release the layers of the sheet means to provide substantially overall contact of the layer of the sheet means adjacent the said presensitised material to press the presensitised material substantially evenly against the film master and the film master against the glass plate, and subsequently exposing the presensitised material to light through the film master.

In one embodiment the vacuum connector means comprises two vacuum connectors, one communicating with the first spacing and the other communicating with the second spacing, the connectors being connected over at least partially separate paths to a vacuum pump means, a first valve means is connected in the path interconnecting the vacuum pump means and said one connector, a second valve means is connected into a portion of the path between the first valve means and said one connector, and a control means connected with the first and second valve means for controlling the operation thereof such that when a presensitised material and film master are located between the sheet means and the glass plate the second valve means is moved from a normally open to a closed position with respect atmosphere and the first valve means is moved from a normally closed position to an open position with respect vacuum so the vacuum pump evacuates the first and second spacings through the vacuum paths, whereby the ridges are formed on the outer surfaces of the sheet means, the first spacing is vented to atmosphere by moving the first valve to its normally closed position and the second valve to its normally open position thereby reflating the first spacing between the layers of the sheet means and consequently sandwiching the presensitised material and film master between the sheet means and glass plate.

In another embodiment the vacuum connector means comprises two vacuum connectors, one communicating with the first spacing and the other communicating with the second spacing, the connectors being connected over at least partially separate paths to a vacuum pump means, a valve means interconnecting the first and second spacings with the vacuum pump means, and a control means connected with the valve means for controlling the operation thereof such that when a presensitised material and film master are located between the sheet means and the glass plate the valve means is operated so that the vacuum pump evacuates the first and second spacings whereby the ridges are formed on the outer surfaces of the sheet means, the first spacing is vented to atmosphere by control of the valve means thereby reflating the first spacing between the layers of the sheet means and consequently sandwiching the presensitised material and film master between the sheet means and glass plate.

Figure 2:
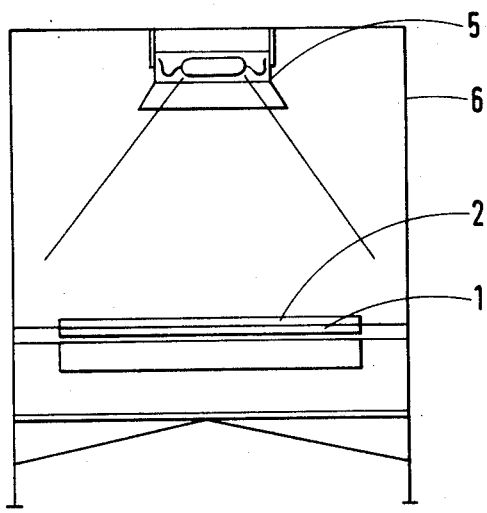
Figure 3:
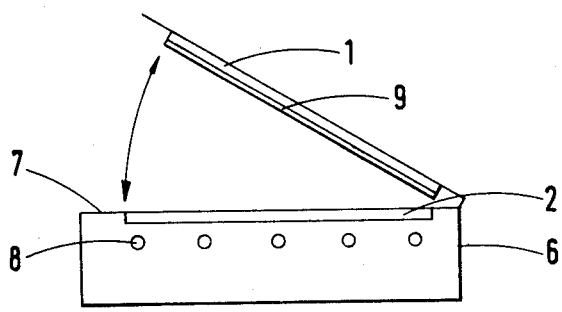
Figure 4:
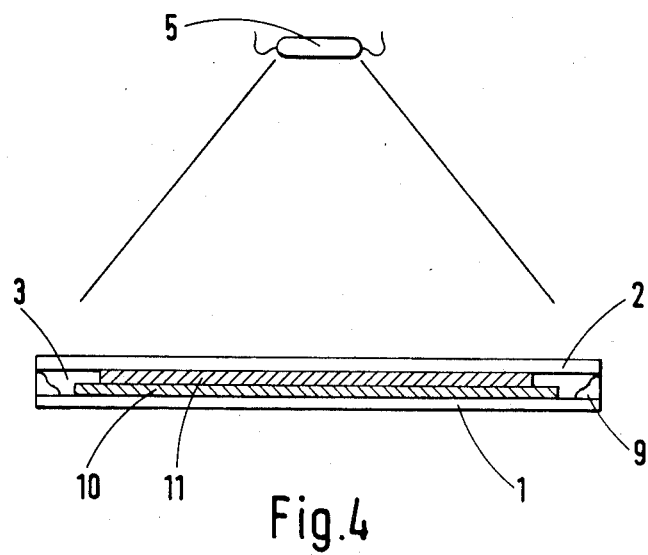
Figure 5A:
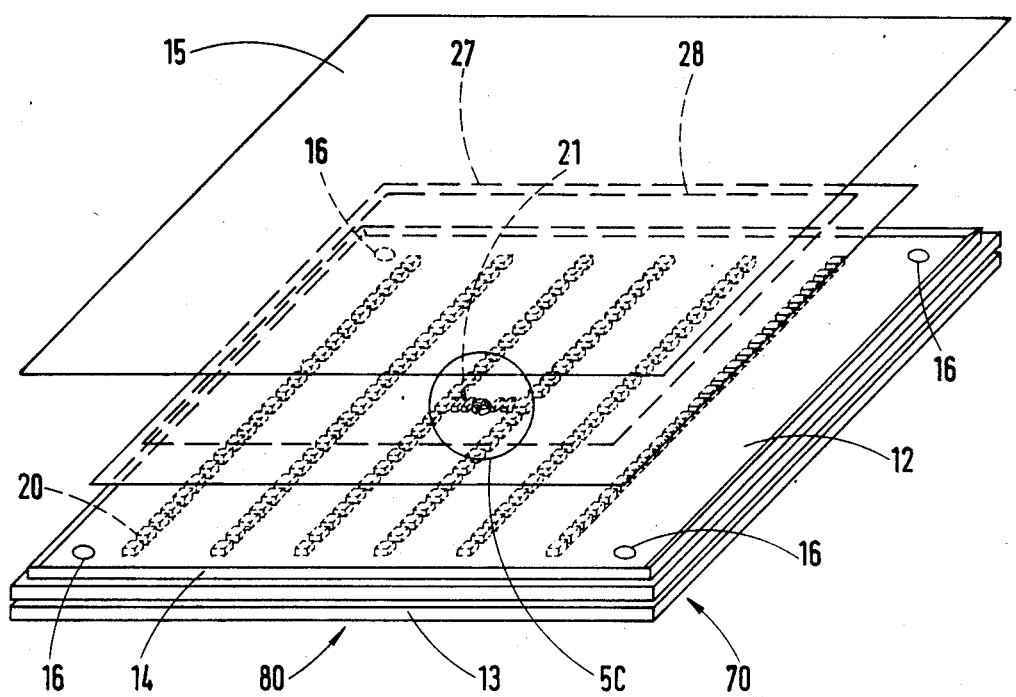
Figure 5B:
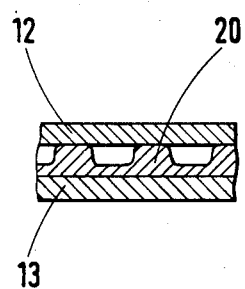
Figure 5C:
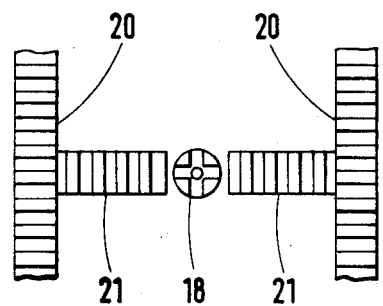

The invention will now be described by way of example with reference to the accompanying drawings, in which:

FIG. 1 is a diagrammatic side elevational view of one known vacuum contact system, FIG. 2 is a diagrammatic side elevational view of a second known vacuum contact system, FIG. 3 is a diagrammatic side elevational view of a third known vacuum contact frame with light source, FIG. 4 is a part sectional side elevational view of a known vacuum contact frame with light source, FIG. 5A is an expanded perspective view of a vacuum contact frame according to one aspect of this invention, FIG. 5B is a cross-sectional view of part of the support blanket of FIG. 5A illustrating spacing strip members, FIG. 5C is a diagrammatic plan view of the portion of the support blanket encircled and labelled 5C in FIG. 5A.

Figure 6A:
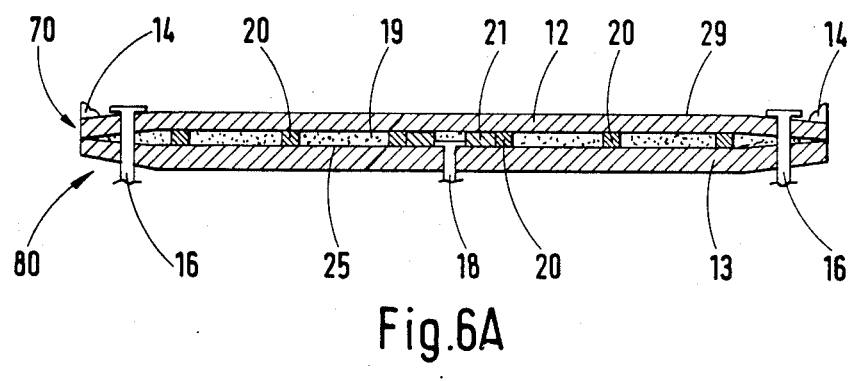
Figure 6B:
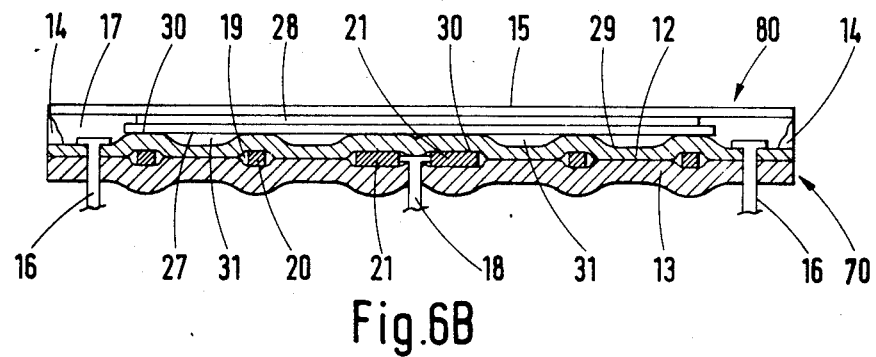
Figure 7:
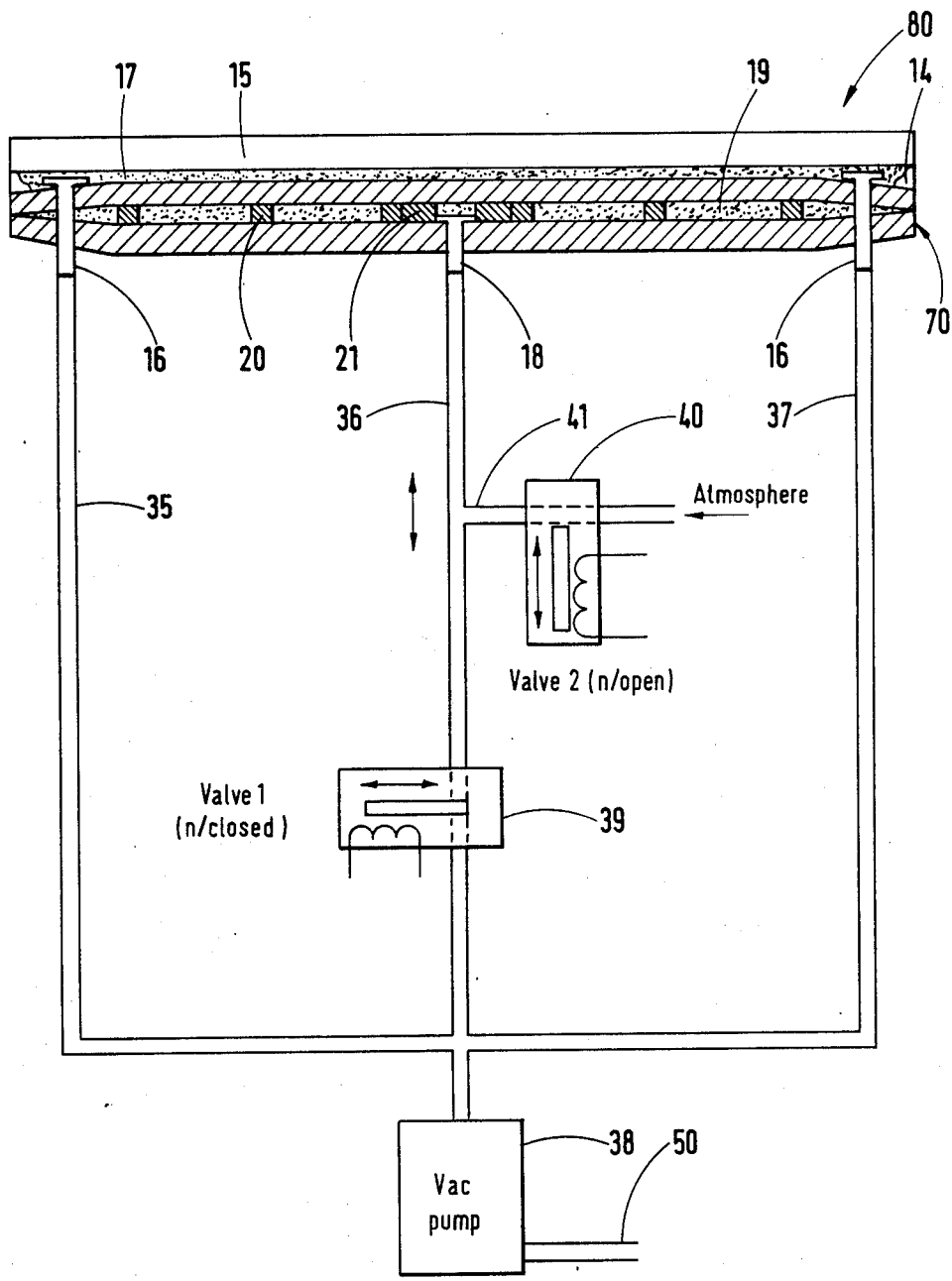
Figure 8:
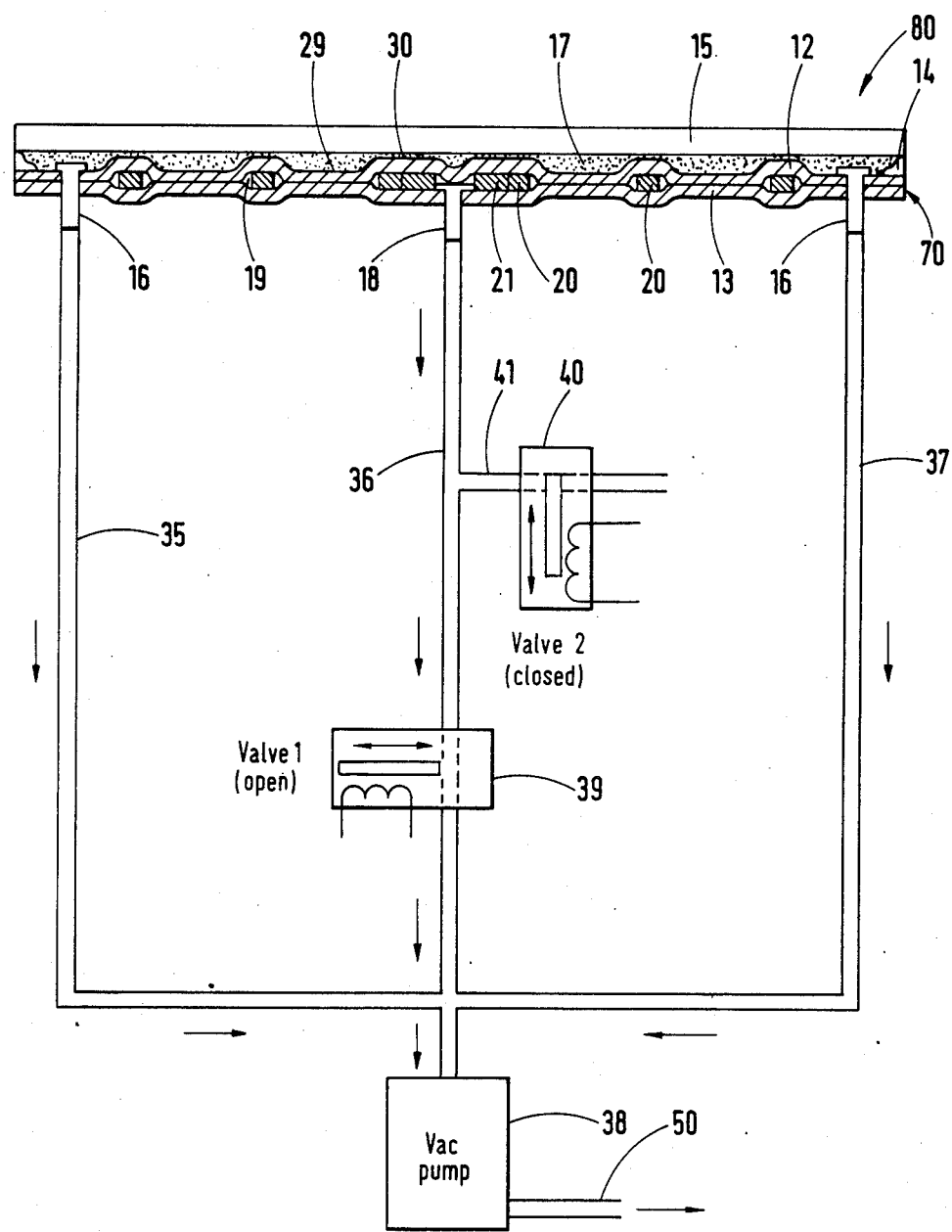
Figure 9:
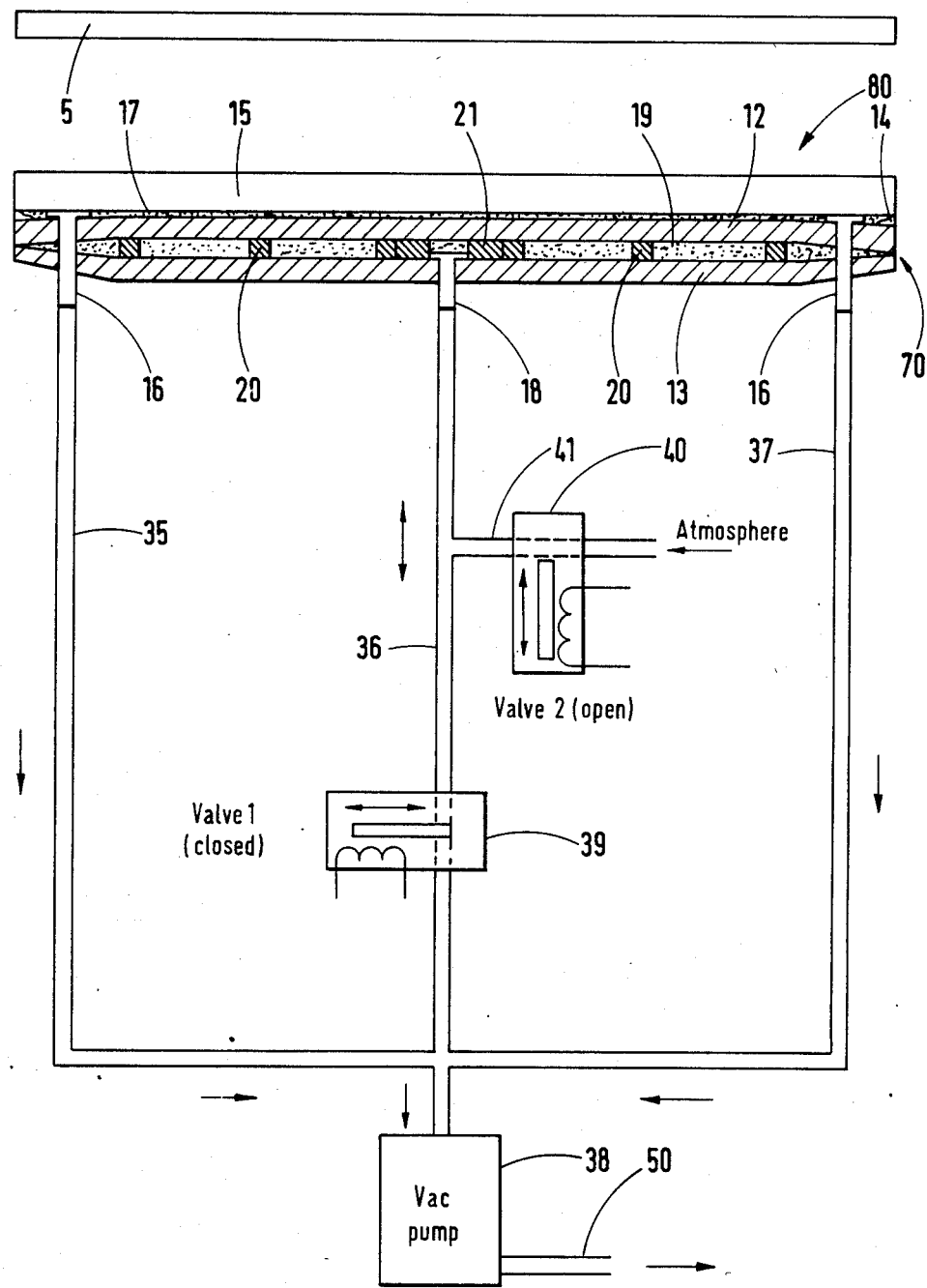
Figure 10:
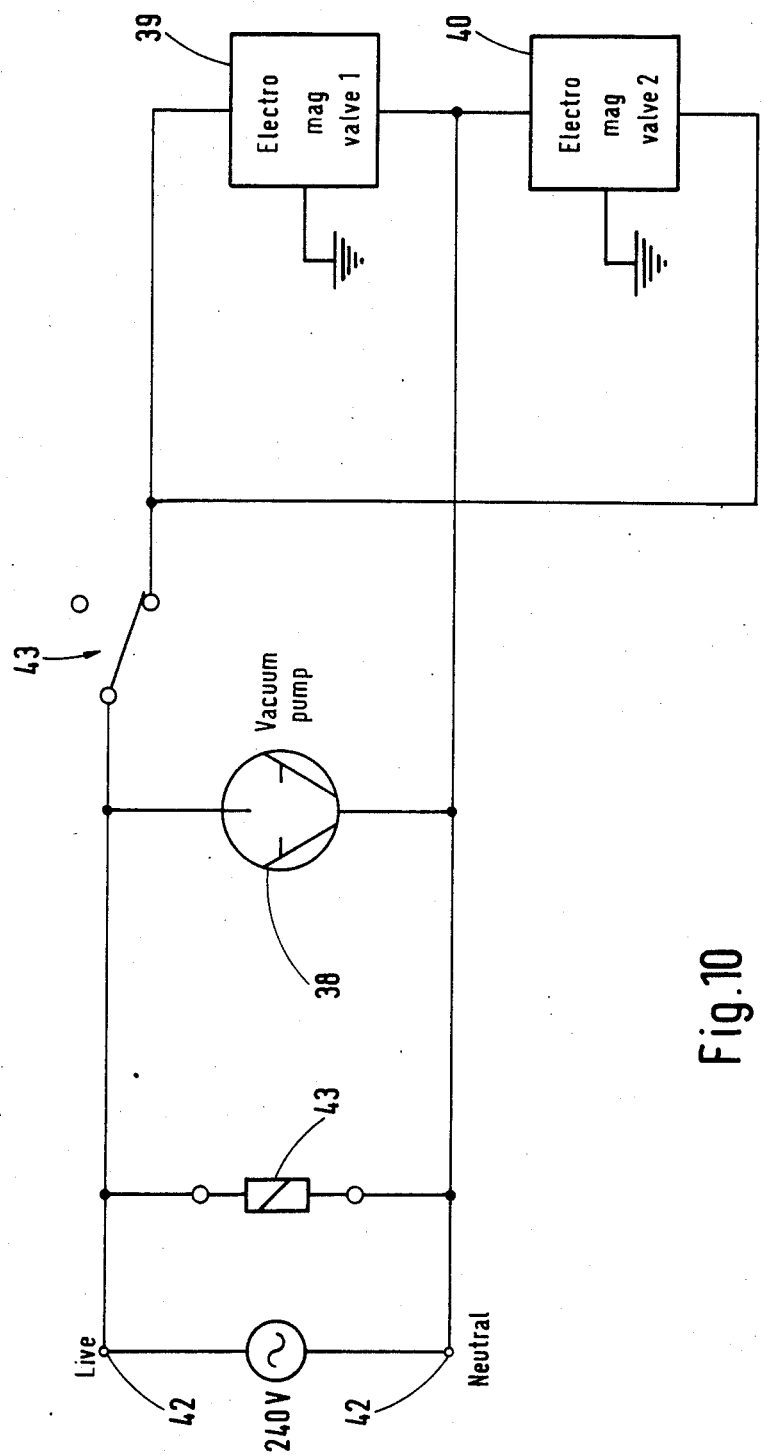

FIG. 6A is a side elevational sectional view of a double layer blanket used in the vacuum contact system according to the present invention, FIG. 6B is a similar view to that in FIG. 6A and illustates the shape of one blanket layer following the initial connection of a vacuum pump, FIG. 7 is a diagrammatic representation of a vacuum contact system according to another aspect of this invention using the vacuum contact frame according to said one aspect of this invention connected with the vacuum pump and electromagnetic control valves, the vacuum pump being in a non-operative condition, FIG. 8 is a similar view to that of FIG. 7 with the vacuum pump in an operative condition, FIG. 9 illustrates the arrangement shown in FIG. 8 in which part of the vacuum contact frame has been vented to atmosphere and including a lamp source, FIG. 10 is an electrical circuit diagram illustrating control connections for controlling the operation of electromagnetic valves in the vacuum circuitry of FIGS. 7, 8 and 9, and FIG. 11 is a diagrammatic representation of another embodiment of the pneumatic airlines utilising a single, composite electromagnetic valve.

FIGS. 1, 2 and 3 illustrate three known systems each of which utilises the concept of a single layer support blanket 1 arranged to form with a glass plate 2 a sealable space 3 which can be evacuated of air.

Although not shown in FIGS. 1, 2 and 3, a presensitised plate is locatable on the blanket 1 and a negative or positive film master is provided adjacent the presensitised plate between the plate and the glass plate 2.

In FIG. 1 the vacuum contact frame is shown to be mounted on a pivot 4 such that the vacuum contact frame is assembled in one position and when rotated through 180° the film master and presensitised plate are exposed to ultraviolet or tungsten light emitted by light source 5. In FIG. 2 the light source 5 is located above the vacuum contact frame which is fixed relative to a housing 6.

In FIG. 3 glass plate 2 is mounted in one side surface 7 of a housing 6 and light source 5 comprises a plurality of flourescent tubes 8 located in the housing 6 beneath the glass plate 2. The blanket 1, having a sealing bead 9 for sealing against the glass plate 2, is pivotably mounted on the housing 6 so that after a film master (not shown) is located on the glass and a presensitised plate (not shown) is located over the film master, the blanket 1 is moved downwardly onto the glass plate 2. Evacuation of the space 3 between the glass plate 2 and the blanket 1 is then effected prior to exposure of the film master to light from the flourescent tubes 8.

The vacuum contact frame of the arrangements of FIGS. 1, 2 and 3 is shown in more detail in FIG. 4 with presensitised plate 10 supported by the blanket 1 and a film master 11 sandwiched between the presensitised plate and glass plate 2. The bead 9 located around the outer edges of the blanket 1 supports glass plate 2 and seals the space 3 between the blanket and glass plate to allow a vacuum to be applied to space 3.

Referring to FIGS. 5A–C and 6A, 6B there is illustrated one embodiment of a vacuum contact frame 80 used in the present invention, having a blanket 70 with first and second resilient vacuum blanket layers 12,13 respectively sealingly connected together along the outer edges thereof. A bead 14 is provided along each edge of the vacuum blanket layer 12 for sealingly and abuttingly supporting glass plate 15. FIG. 5A shows the blanket layers and glass plate to have a square shaped configuration.

Four vacuum connectors 16 extend through the vacuum blanket 70 and serve to evacuate space 17 between the glass plate 15 and the blanket layer 12. One further vacuum connector 18 is located through the blanket layer 13 to evacuate spacing 19 between the vacuum blanket layers 12, 13. The vacuum connectors 16, 18 are clamped to the blanket by a lock nut for example (not shown).

A plurality of elongate parallel strip members 20 are located between the blanket layers 12,13. Relatively short strip members 21 extend transversely to the strip members 20 in the region of centrally mounted vacuum connector 18 shown ringed in FIG. 5A and in more detail in FIG. 5C. Each of the members 20 comprises a castellated belt secured in ridges 20 comprises a toothed belt secured in position on inner surface 25 of blanket layer 13 and maintain predetermined spacings between the two blanket layers to ensure the maximum amount of air is evacuated when a vacuum pump is operatively connected. The castellations of the members 20, 21 are illustrated in FIG. 5B in relation to the blanket layers 12, 13 and extend transversely to the longitudinal direction of the members.

The members 21 are particularly useful in fulfilling removal of air close to the central vacuum connector 18 which like the other vacuum connectors 16 has a head with a cruciform shaped recess to ensure removal of air even when blanket layer 13 engages the upper surface of the head of the vacuum connector 18.

FIGS. 6A and 6B show cross-sectional views of the support blanket prior to evacuation and after initial evacuation, respectively, of space 19 between the layers 12, 13 of the vacuum support blanket.

The vacuum contact frame is used to support a presensitised plate 27 and negative or positive film master 28. The presensitised plate 27 is laid on surface 29 of the blanket layer 12 and the film master 28 is located between the presensitised plate and the glass plate 15. A light source 5 (shown in FIG. 9) emitting ultraviolet or tungsten light is located above the glass plate 15 to expose the film master onto the presensitised plate.

Prior to exposure it is essential to ensure that the presensitised plate and film master are in close overall contact, otherwise an untrue image reproduction will occur. Overall contact is achieved in the present embodiment by connecting a vacuum pump to the vacuum connectors 16, 18 to evacuate air from the spaces 17 and 19. As the air is evacuated the blanket is drawn as a whole towards the glass plate 15 to sandwich the presensitised plate 27 and film master 28 into contact together and with the glass plate 15. Simultaneously, the blanket layers 12 and 13 are drawn together and initially take the shape shown in FIG. 6B in which there are a number of raised ridges 30 where the blanket layer 12 passes over the elevated castellations of the member 20, 21. The raised ridges 30 engage the undersurface of the presensitised plate 27 leaving elongate channels 31 between the raised ridges.

Only the relatively small contact area of the raised ridges 30 actually engage the undersurface of the presensitised plate thus virtually totally eliminating the occurance of air pockets between the raised ridges and the presensitised plate. Furthermore, evacuation of air from the space 17 and hence the channels 31 removes the possibility of air pockets being left in the channels 31. When the space 17 is evacuated to the required level the space 19 is vented to atmosphere thus causing the blanket layer 12 to return substantially to the form as shown in FIG. 6A whereupon the blanket layer 12 presses evenly over the whole contact area of the presensitised plate without the presence of air pockets.

As mentioned above, the elongate castellated members 20, 21 advantageously assist in the removal or evacuation of air from space 19 to ensure complete evacuation but prior to the evacuation the blanket layer 12 takes the correct form substantially as shown in FIG. 6A. After initial evacuation of spaces 17 and 19 most of the air is removed and the blanket layers 12, 13 take the form shown in FIG. 6B. Any air remaining in space 17, mainly along the channels 31, is removed by continued evacuation which also serves to remove air pockets which can occur between the film master and glass plate.

Turning specifically to FIGS. 7 through 9 which show various stages in the photographic exposure process, the vacuum contact frame is illustrated with only the vacuum blanket and glass plate 15 for the purposes of clarity, a film master and presensitised plate are assumed to be present. In these figures vacuum connectors 16, 18 are connected via pipes 35, 36, 37 to a common single vacuum pump 38 having an exhaust port 50.

Pipe 36 connected with the vacuum connector 18 is coupled to the vacuum pump 38 via an electromagnetically operable valve 39 which is normally in a closed to a vacuum condition in its non-energised state as shown in FIG. 7. A second electromagnetically operable valve 40, which in its non-energised state is normally open to atmosphere, is connected by a pipe 41 into the pipe 36 between the valve 39 and the connector 8. When the second valve 40 is open the space 19 between the blanket layers 12,13 is thus vented to atmosphere through the pipe 41 and pipe 36.

The electromagnetic valves 39 and 40 are operated by the electrical circuit shown in FIG. 10 and are connected in parallel across a mains supply connected to terminals 42 through a switch 43. The vacuum pump 38 is connected between the terminals 42 across the mains supply and operates immediately the mains supply is connected to the surface via a vacuum switch not shown.

With the electrical control circuit disconnected from the mains supply the spacings 17, 19 are at atmospheric pressure due to leakage through the pump 38 and the blanket takes its normal condition with the layers overall spaced from one another by the members 20, as shown in FIGS. 6A and 7. Under these conditions the film master and presensitised plate are inserted between the blanket 12, 13 and glass plate 15.

When the mains supply is connected to the circuitry of FIG. 10 and with switch 43 in the closed position shown, the electromagnetic valves 39, 40 are energised to take open and closed conditions respectively. Under these conditions, as illustrated in FIG. 8, the vacuum pump 38 is operable to evacuate air from the spacings 17 and 19 over the pipes 35, 36, 37 so that the blanket layers 12, 13 draw together as shown in FIGS. 6B and 8 as the vacuum condition.

When the required vacuum levels have been achieved switch 43 is opened disconnecting the electromagnetic valves from the mains supply thus de-energising the electromagnetic valves 39, 40 and changing them to their normal de-energised conditions in which, as illustrated in FIG. 9, electromagnetic valve 39 is closed so as to disconnect the vacuum pump 38 from the space 19, and the electromagnetic valve 40 is opened allowing the space 19 to be vented to atmosphere through pipes 41 and 36. The vacuum pump 38 remains operatively connected via pipes 35, 37 to spacing 17 to maintain the vacuum within spacing 17. With the blanket layers 12 and 13 reflated the blanket layer 12 is drawn against the presensitised plate 27 to provide even overall contact therewith without air pockets and thus sandwiching the presensitised plate and film master together and against the glass plate 15. The blanket layer 13 retains its normal configuration as shown in FIG. 9 spaced from blanket layer 12 by reflation and the ridges 20, 21.

Figure 11:
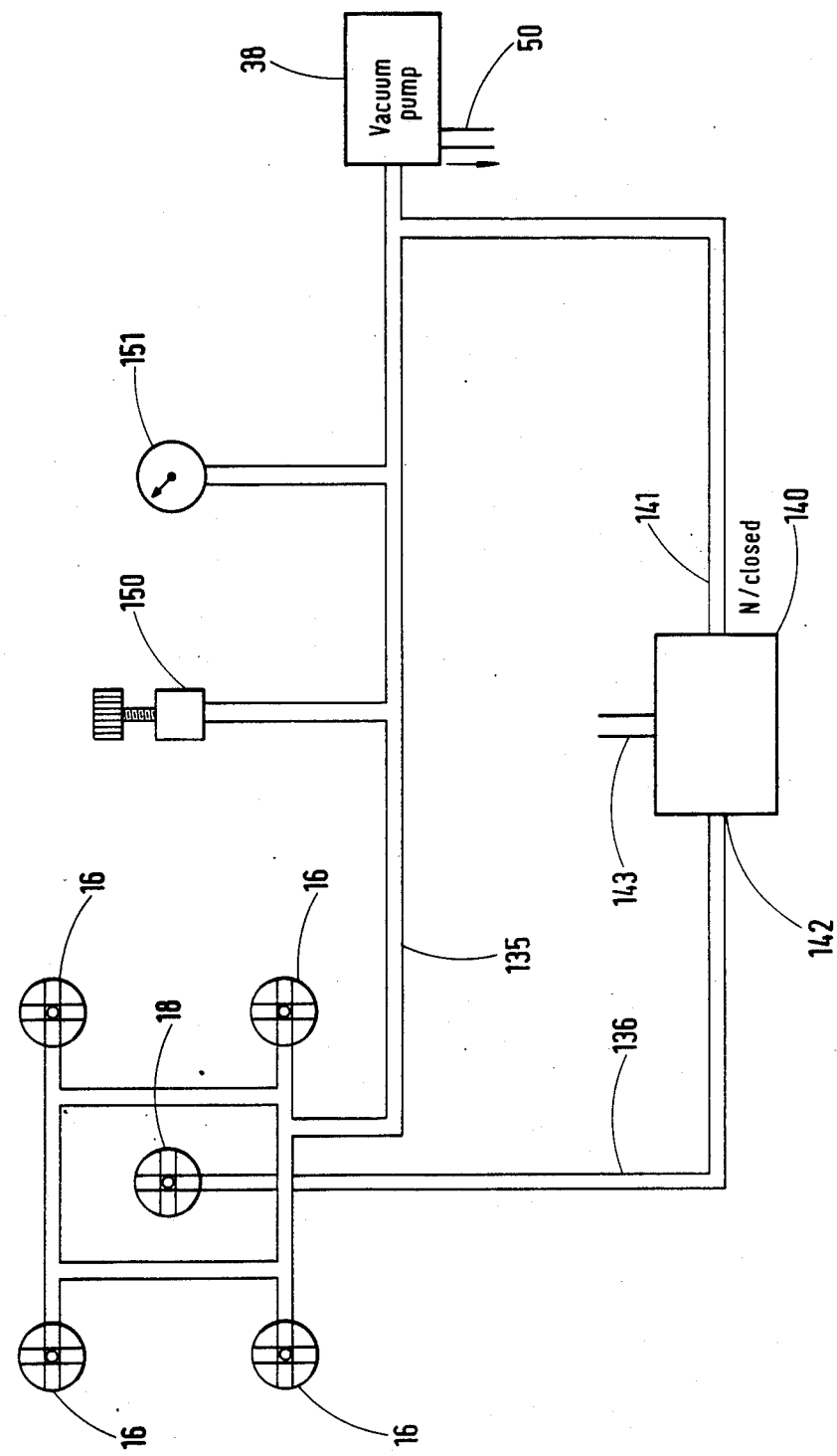

Referring now to FIG. 11, another arrangement of the pneumatic paths in which a single, composite three port electromagnetic valve 140 is used. In this respect the valve 140 has a normally closed port 141 which is connected to the vacuum pump 38, a port 142 which is connected to the connector 18 over pipe 136 and a normally open exhaust port 143. The connectors 16 are connected to the vacuum pump 38 over pipe 135 and a bleed valve 150 and a gauge 151 are also connected into the pipe 135. The arrangement shown in FIG. 11 is operated in such a fashion to produce the same effect as the arrangement shown with reference to FIGS. 7–9.

The use of the double layer blanket in the vacuum contact system of this invention not only provides improved overall contact between the presensitised material and film master, but also such contact is obtainable in approximately 25% of the time in which known systems operate to achieve similar although inferior contact.

In this respect the prior art systems are known to take a typical of 2 min. 10 secs. from the initiation of the vacuum until the master is in usable contact with the glass plate. With the present system the total time taken is 30 to 35 seconds, which is approximately 20 seconds to evacuate both spaces 17 and 19, and 10–15 seconds to totally vent space 19 to atmospheric pressure.

In each of the described embodiments of the present invention the blanket layers 12, 13 each comprise insertion rubber, that is a sheet of rubber having one or more layers with one outer surface having a fabric finish. Alternatively the outer surfaces of each layer may have a fabric face. The very small indentations provided by the fabric finish or face assist in ensuring removal of air pockets in the vacuum contact frame and also prevent the presensitized plate from adhering thereto. Where a layer has only one fabric finished surface the fabric finished surface of blanket layer 12 is the surface which contacts the presensitised plate, whilst the same fabric type of surface on blanket layer 13 is that adjacent blanket layer 12. By fabric finish is meant either a fabric impression in the rubber surface or a layer of fabric being mounted on the rubber blanket layer(s).

Furthermore, applicants' invention advantageously provides an improvement in the standardisation of vacuum times for mass production purposes.

In addition the pressure across the photographic exposure area is maintained at a substantially even overall level, whilst the system is advantageously operated with only a single vacuum pump to reduce both constructional and operational costs. Further, mechanical movement between the presensitised plate and the film master is reduced to a minimum.

I claim:

1. A vacuum contact system including a vacuum contact frame, a bi-layer sheet means having a spacing means defining a first spacing between the two layers thereof and each of said layers being flexible, and a glass plate over the sheet means, and means for defining a second spacing between the sheet means and glass plate such that a film master and presensitised material are locatable in the second spacing for contact one against the other and subsequent exposure of the film master onto the presensitised material, vacuum pump means connected to each of the first and second spacings, and control means for controlling the coupling of the vacuum pump means to the first and second spacings such that the vacuum pump means removes air from both the first and second spacings, the removal of air from the first spacing causing the layers of the bi-layer sheet means to be brought together except in locations defined by said spacing means, and then the control means allows the first spacing to be vented such that under the vacuum maintained in the second spacing the layer of the support blanket adjacent the glass plate presses the presensitised material substantially evenly against the film master over the area of the film master against said glass plate.

2. A vacuum contact system as claimed in claim 1 wherein the vacuum pump means is a single vacuum pump.

3. A vacuum contact system as claimed in claim 2 wherein the control means includes at least one electromagnetic valve arranged to control the connection of the vacuum pump to the first and second spacings.

4. A vacuum contact system as claimed in claim 3 wherein a pair of electromagnetic valves are connected, electrically, in parallel, one being arranged to be normally open and the other normally closed.

5. A vacuum contact system as claimed in claim 4 wherein the normally open electromagnetic valve is vented to atmosphere and the normally closed electromagnetic valve is closed to vacuum.

6. A vacuum contact system as claimed in claim 3 wherein a single composite electromagnetic valve device is used to control the connection of the vacuum pump to the first and second spacings.

7. A vacuum contact system as claimed in claim 1 wherein the means for defining the second spacing is a bead provided along each edge of the sheet means adjacent the glass plate for abutting and sealing therewith.

8. A vacuum contact system as claimed in claim 1 wherein the spacing means comprises a plurality of spaced strip members.

9. A vacuum contact system as claimed in claim 8 wherein the strip members are longitudinally castellated to facilitate evacuation of the first spacing and said strip members are located in a spaced parallel configuration.

10. A vacuum contact system as claimed in claim 8 wherein a first and a second vacuum connector is provided for communicating with a respective first and second spacing, said vacuum connectors being connected to the vacuum pump means.

11. A vacuum contact system as claimed in claim 10 wherein each connector in a portion thereof located in an associated spacing has a planar face in which is provided a cruciform shaped recess.

12. A vacuum contact system as claimed in claim 11 wherein a strip member extends radially from opposing limbs of the cruciform shaped recess of an associated connector.

13. A vacuum contact frame system comprising a bi-layer sheet means, each said layer of the sheet means being flexible, spacing means defining a first spacing between the two layers of said sheet means and about which said layers are deformable, said sheet means being arranged for supporting a film master and presensitised material onto which the film master is to be exposed, a glass plate arranged to be located over the sheet means and combination of film master and presensitised material, means for defining a second spacing between the sheet means and the glass plate, and vacuum connector means mounted on the sheet means which communicate with the first and second spacings respectively for removing air therefrom.

14. A method of operating a vacuum contact frame system comprising a bi-layer sheet means having a plurality of strip members defining a first spacing betwen the two layers thereof, a glass plate locatable over the sheet means, means defining a second spacing between the sheet means and the glass plate, and vacuum connector means communicating with and removing air from the first and second spacings, the method comprising obtaining a vacuum in both the first and second spacings to draw the layers of the sheet means together so that ridges are formed in said layers by virtue of the strip members and so that the sheet means is drawn toward the glass plate to sandwich a presensitised material and a film master to the glass plate by the sheet means ridges, said presensitised material being adjacent said sheet means and said film master being adjacent said glass plate, venting the first spacing to release the layers of the sheet means to provide substantially overall contact of the layer of the sheet means adjacent the said presensitised material to press the presensitised material substantially evenly against the film master and the film master against the glass plate, and subsequently exposing the presensitised material to light through the film master.

15. A method as claimed in claim 14 wherein the vacuum connector means comprises two vacuum connectors, one communicating with the first spacing and the other communicating with the second spacing the connectors being connected over at least partially separate paths to a vacuum pump means, a first valve means is connected in the path interconnecting the vacuum pump means and said one connector, a second valve means is connected into a portion of the path between the first valve means and said one connector, and a control means connected with the first and second valve means for controlling the operation thereof such that when a presensitised material and film master are located between the sheet means and the glass plate the second valve means is moved from a normally open to a closed position with respect atmosphere and the first valve means is moved from a normally closed position to an open position with respect vacuum so the vacuum pump evacuates the first and second spacings through the vacuum paths, whereby the ridges are formed on the outer surfaces of the sheet means, the first spacing is vented to atmosphere by moving the first valve to its normally closed position and the second valve to its normally open position thereby reflating the first spacing between the layers of the sheet means and consequently sandwiching the presensitised material and film master between the sheet means and glass plate.

16. A method as claimed in claim 14 wherein the vacuum connector means comprises two vacuum connectors, one communicating with the first spacing and the other communicating with the second spacing, the connectors being connected over at least partially separate paths to a vacuum pump means, a valve means interconnecting the first and second spacings with the vacuum pump means, and a control means connected with the valve means for controlling the operation thereof such that when a presensitised material and film master are located between the sheet means and the glass plate the valve means is operated so that the vacuum pump evacuates the first and second spacings whereby the ridges are formed on the outer surfaces of the sheet means, the first spacing is vented to atmosphere by control of the valve means thereby reflating the first spacing between the layers of the sheet means and consequently sandwiching the presensitised material and film master between the sheet means and glass plate.

17. A vacuum contact system for use in the method of claim 14, said system including a vacuum contact frame, a bi-layer sheet means having a spacing means defining a first spacing between the two layers thereof and each of said layers being flexible, and a glass plate over the sheet means, and means for defining a second spacing between the sheet means and glass plate such that a film master and presensitised material are locatable in the second spacing for contact one against the other and subsequent exposure of the film master onto the presensitised material, vacuum pump means connected to each of the first and second spacings, and control means for controlling the coupling of the vacuum pump means to the first and second spacings such that the vacuum pump means removes air from both the first and second spacings the removal of air from the first spacing causing the layer of said bi-layer sheet means to be brought together except in locations defined by said spacing means, and then the control means allowing the first spacing to be vented such that under the vacuum maintained in the second spacing the layer of the support blanket adjacent the glass plate presses the presensitised material substantially evenly against the film master over the area of the film master against said glass plate.

* * * * *